_Patented Mar. 4, 1947_

2,416,682

UNITED STATES PATENT OFFICE 2,416,682

SUGAR RECOVERY PROCESS

Arvid M. Erickson, San Jose, and John D. Ryan, Campbell, Calif., assignors to Barron-Gray Packing Company, San Jose, Calif., a corporation of California No Drawing. Application December 16, 1942, Serial No. 469,230

15 Claims. (Cl. 127—46)

This invention relates to a process for purifying sucrose compositions. More particularly it relates to a process for recovering sucrose from sucrose compositions containing impurities of a nature and in a quantity such that they materially interfere with the separation of the sucrose in the form of crystals.

The methods heretofore proposed for recovering sucrose from very impure solutions thereof containing glucose have involved selective fermentation of glucose to alcohol with a minimum fermentation of sucrose followed by separation of the sucrose from the alcohol and other impurities by precipitation of either the sucrose or the alcohol and other impurities. Serious disadvantages in these methods have been recognized.

It is an object of the present invention to provide an improved process for purifying impure sucrose solutions.

A further object is to provide an improved method for eliminating non-sugar impurities from impure sucrose compositions containing substantial quantities of glucose by precipitation of the impurities from solutions of the sucrose composition, in which method the precipitated impurities are obtained in a form in which they are readily filtered out and sweetened off and in which method the filtrate obtained when the precipitated impurities are separated is a relatively pure and substantially sterile solution of sucrose and glucose which may be used as such or may be further treated to eliminate glucose producing a relatively pure solution of sucrose which may also be used as such or processed to recover sucrose in relatively pure crystalline form.

Other objects will appear hereinafter.

It has now been found that the foregoing objects are accomplished by a process in which impure solutions of sucrose in an aqueous medium containing substantial amounts of impurities which are difficult to remove by precipitation and filtration, particularly those containing glucose and other impurities which prevent or render impractical the crystallization of the sucrose or any substantial portion thereof, for example, molasses derived from sugar cane, are treated with a divalent alkaline material in sufficient quantity to increase the pH of the solutions to a pH above 10 where a precipitate separates out and which is at the same time sufficiently high to result, upon subsequent addition of acidic material as described hereinafter, in the formation of a granular, easily filterable and washable precipitate containing substantially all the gums, waxes and other organic substances which retard filtration along with acids and ash forming materials in the mixture including those added in the form of reagents. It will be apparent, moreover, that the invention does not merely apply to impure sucrose compositions which are already in solution in an aqueous medium, but instead to impure sucrose compositions generally, particularly those containing glucose and other impurities soluble in aqueous media, since such compositions can be readily dissolved in an aqueous medium to give a sucrose solution as described, which lends itself to treatment according to the present process.

After the pH has been increased above 10, as described, a suitable acid is added in sufficient quantity to reduce the pH to a pH below 10 at which the aforementioned granular, easily filterable and washable precipitate is obtained. Usually the granular, easily filterable and washable precipitate containing the undesired impurities is obtained at a pH below about 9.2, approximating the pH of the original impure sucrose solution or therebelow. It may, however, be found at a pH above the pH of the original molasses or other impure sucrose solution in some cases. On the other hand it is preferable to avoid decreasing the pH to a pH which is lower than the pH of the natural juices of any plant producing sucrose and glucose in combination. Thus the juice from fresh, ripe sugar cane would generally have a pH between about 4.6 and 5.3. It is accordingly possible to go to a pH as low as 4.6 with little or no destruction of sucrose. It is also possible to go to pH's below 4.6, but such lower pH's are not preferred, because of the tendency for sucrose to be inverted in such highly acid solutions.

In carrying out this process, it has been found that the increase of the pH above 10, as described, does not result in any permanent or difficultly removable color in the resulting filtrate, provided the mixture is kept at a temperature which is not substantially elevated, that is, preferably below about 54° C., during the time when it has a pH in excess of about pH 9.2, that is, during at least the time when the latter part of the alkaline material is added, and thereafter until the pH has been reduced with acid to below about 9.2. The granular and easily filterable and washable precipitate, mentioned above, is readily separated to leave a clear liquid, by any desired filtering means. As described hereinafter, it is sometimes desirable to add reagents to this clear liquid and separate any precipitate so formed before carrying the process further.

The clear liquid from which the impurities have been eliminated, as described above, is now also substantially sterile. It is next treated to selectively ferment glucose sugars into alcohol without materially affecting any sucrose present.

When the fermentation has proceeded to the desired extent, as hereinafter described, separation of the alcohol from the fermented mass, preferably after separation of the yeast, yields a relatively pure sucrose solution from which impurities such as glucose and other non-sugar impurities have been largely or completely eliminated. It is, accordingly, ready to be treated for the crystallization of a strike of sugar. This relatively pure sucrose solution is, in general, comparable in composition to the solutions from which sugar is crystallized in the ordinary commercial processes involving the recovery of crystalline sucrose from solutions, it will be readily appreciated by those skilled in the art that these solutions may be handled in any of the variety of ways in which the comparable sucrose solutions are handled in order to effect a recovery of their sucrose content and that, in general, they may be treated in any desired way to recover sucrose in crystalline form.

The present invention is applicable to the treatment of a wide variety of different types of impure sucrose solutions containing glucose or fermentable sugars and other impurities which render the recovery of the sucrose from such solutions directly by crystallization with or without concentration, impractical or impossible. Such impure sucrose solutions are produced, for example, at various stages of the process of preparing relatively pure sucrose crystals from natural sources of sucrose, in which sucrose is the predominant sugar but in which glucose is also present, such as sugar cane, sorghum and the like and include molasses from sugar cane, as well as other types of sucrose containing materials derived from sugar cane, such as affination syrups, settlings or scums from clarifiers or settling tanks, sluices from press filtrations and many others.

One of the largest sources of such impure sucrose solutions is molasses from sugar cane, including the various kinds and grades of molasses produced in the recovery of raw sugar at the cane sugar plantation and in the preparation of relatively pure crystalline sucrose in refineries from raw cane sugar and it is to such plantation and refinery molasses derived from sugar cane and containing glucose and other impurities that the present invention is particularly applicable. The various sucrose solutions to which the present invention is applicable do not all contain the same impurities or the same quantities of impurities and, in fact, vary widely in the nature and quantity of impurities present. This is true even with sucrose solutions of the same general kind, or from the same general source. For example, even a particular molasses from a particular sugar cane plantation will not have a uniform composition at all times, due among other things to variations in the kind and amount of impurities present in the sugar cane from which the molasses is derived.

Because the present invention is adapted to the treatment of a wide variety of different types of sucrose solutions, the properties of which vary considerably, it is not possible to give the exact pH above 10 to which a particular impure sucrose solution is preferably raised, and it is similarly impossible to give the exact pH below about 9.2 at which such sucrose solution is preferably filtered following the addition of acid. This is true because the preferred treatment conditions even for one particular batch of molasses of a particular kind, for example, may be quite different from those of another, due to variations in the characteristics of the batches. Such variations will be even greater between batches of sucrose solutions of different types. The preferred maximum pH and the preferred pH at which to carry out the filtration are, however, readily determined in any given case by very simple tests and, in view of the possibility of variation, even between different batches of molasses of a particular type, such as refinery molasses, for example, it is preferable to make a determination of the preferred maximum pH and preferred pH of filtration, as described hereinafter, on each batch of impure sucrose solution treated.

The preferred pH to which to increase an impure sucrose solution is determined by taking a small batch of the solution, for example, a cane sugar molasses and then while keeping the temperature below about 54° C., increasing the pH of the solution by adding the divalent alkaline reagent. The addition may be relatively rapid until a pH of about 10 is reached and it should be then continued slowly, preferably with constant agitation until a pH is reached at which a definite break occurs. Usually the mass will turn to a somewhat yellow color in the case of a dark molasses, before this pH is reached. By a "definite break" is meant a break between the solids and liquids resulting in the settling of solid materials to leave a portion of clear liquid. A soon as this break occurs, the addition of alkaline material is interrupted.

Thereafter a slight additional quantity of the reagent is preferably added in order to be sure that the entire mixture is carried through the pH at which the break occurs. A sufficient time (usually ten to twenty minutes), is then allowed to permit the resulting reaction to proceed to completion. Preferably, during this period, the mixture is agitated continuously or at least frequently. When sufficient time has been allowed to permit the mixture to reach equilibrium, the pH is measured and recorded.

The acid reagent is then preferably added immediately with agitation to reduce the pH, the temperature still being kept below 54° C. The addition of acid is preferably carried out slowly after the pH has been dropped below about 9.2. Below about pH 9.2 the pH is followed carefully as the acid is added and the pH is noted beyond which no further precipitate is produced by further addition of acid down to the minimum pH of a natural juice from a plant producing sucrose and glucose in combination. The pH noted is the optimum point at which to filter the mass. The addition of acid is preferably continued at least down to the pH of the original sucrose solution or slightly lower in order to be certain that the true optimum point is reached.

The alkaline reagent is then added to another batch of the sucrose solution, as described above, in sufficient quantity to just carry the mixture through the pH at which the break occurs, the resulting mixture is agitated and allowed to reach equilibrium, then the acid reagent is added to reduce the pH to the predetermined optimum, the temperature, as before, being maintained below about 54° C., until the addition of the acid reagent is completed. Thereafter the mass is heated until a granular precipitate is formed. This may occur, depending upon the particular sucrose solution, anywhere from about 54° C., to the boiling point. As soon as a granular precipitate is formed, however, in this test as well as in larger scale operations, it is preferable to discontinue the heating entirely and apply no further heat until after filtration as further heating beyond the point where a granular precipitate is formed tends to cause a sliming.

Following the heating, the mixture is then preferably tested on a Buchner funnel to determine the rate of filtration. Also the pH of the resulting filtrate is determined. This pH should be slightly lower than the pH to which the mixture was adjusted with acid prior to heating and if it is not, it is an indication that the alkaline reagent was not given sufficient time to react at the maximum pH before adding the acid reagent. Accordingly, where the pH of the filtrate is not lower than the pH prior to heating the test should be repeated as described above, allowing increased time for the reaction at the maximum pH. If, on the other hand, the rate of filtration is too slow for practical production purposes, sufficient of the alkaline reagent is added to a fresh sample of the impure sucrose solution to increase the pH of the solution to a pH higher than the previously determined maximum, for example, to a pH about $\tfrac{1}{10}$ of a pH unit higher than the previously determined maximum pH. After agitating and allowing sufficient time for the reaction at this higher pH to go to completion, the pH is measured and noted and the acid reagent is then added to this further test portion with agitation in the manner described above until the pH has been gradually reduced at least to approximately the pH of the original sucrose solution or slightly lower down to the minimum pH of a natural juice from a plant producing sucrose and glucose in combination as indicated above, noting the pH beyond which further additions of acid do not cause any further precipitation, both additions being carried out below 54° C., as described above.

Still another sample is then increased to the new maximum, brought to equilibrium and then reduced to the pH determined on the preceding sample. This portion is maintained below about 54° C., until after the addition of the acid reagent and is then heated, as described above, and tested on a Buchner funnel and the pH of the filtrate is determined. If this pH is slightly lower than the pH prior to heating and if filtration now takes place at a satisfactory rate, the proper maximum pH and the proper pH to which to reduce the mixture following the increase to a maximum have now been determined for the whole batch of impure sucrose solution. However, if filterability is still not satisfactory, or if the pH of the filtrate is not slightly lower than the pH prior to heating, the testing procedure is repeated, again increasing the pH to a maximum slightly higher than that of the preceding sample, and/or increasing the time allowed for reaction at the maximum pH, determining the pH to which a sample raised to the new maximum and/or actually brought to equilibrium at the maximum pH should thereafter be reduced and again testing for filterability and pH of the filtrate when employing these newly determined conditions.

Particularly in the case where some difficulty is encountered in determining the proper pH to which to reduce the impure sucrose solution prior to filtration, a slightly different procedure than that described above may be used. In accordance with such alternative procedure several samples of the impure sucrose solution are treated with divalent alkaline material to increase their pH to the maximum pH above 10, as described above. Then after reaction at the maximum pH is complete, each successive sample is reduced to a pH $\tfrac{1}{10}$ of a pH unit lower than the preceding sample, beginning with a pH of about 9.2 and continuing down to the pH of the original sucrose solution or slightly lower down to the minimum pH of a natural juice from a plant producing sucrose and glucose in combination, as indicated above. Each of these samples, as in the test first described, is maintained below about 54° C., until the addition of acid thereto is complete. They are all then heated to a temperature between about 54° C. and the boiling point to complete the reaction, as described above. It is then possible to select very readily the sample which gives the most satisfactory results in the filtration test. As a further check a small portion of the filtrate from each sample may be further acidified down to the pH of the lowest sample to determine whether any additional precipitate forms.

It will be apparent that the acid and alkaline materials employed in the test are preferably those to be used in treating the main batch and that, preferably, but not necessarily, exactly the same reagents are employed. The use of exactly the same reagents is particularly desirable in commercial operation, since it facilitates the addition of the reagents to the main batch of sucrose solution on a quantity basis rather than on a pH basis. Addition of reagents on a quantity basis obviously lends itself more readily to commercial operation and has been found to give the same results as addition on a pH basis when based on a test.

To this end in carrying out the above described tests, a measured sample of the sucrose solution is employed in each test and in addition to noting the pH to which the mixture should be increased with the alkaline reagent and the pH to which it should be reduced with the acid reagent, the quantities of these two reagents which are required to effect the pH adjustments are also noted. Then the main batch of the sucrose solution is measured and the appropriate quantities of reagents to produce the desired pH conditions therein can be readily calculated.

By way of example, it has been found that about ¾% to 3% of $Ca(OH)_2$, by weight, based on the weight of the sucrose solution, is usually sufficient to increase the pH of a 45° Brix solution of low grade cane molasses to the proper point. Thereafter such molasses solution may usually be reduced to the proper pH at which to heat and filter by adding about 4 to 6 gallons of a 75%, by weight, aqueous solution of $H_3PO_4$ per ton of the molasses. While these proportions are given in terms of concentrated reagents it will be understood that both the $Ca(OH)_2$ and the 75% $H_3PO_4$ are usually mixed with a diluent, such as water, prior to adding them in accordance with the preference set forth elsewhere herein.

In accordance with the preferred procedure of the present invention impure sucrose compositions containing glucose and non-sugar impurities as described above, such as, for example various grades of plantation or refinery cane molasses, particularly plantation cane molasses, or raw cane sugars, or cane sugar containing juices or massecuites, or other impure sucrose compositions containing glucose and non-sugar impurities or mixtures of two or more of the foregoing, or mixtures of any of the foregoing with other sucrose containing materials, unless they are already in the form of aqueous solutions having a specific gravity, such that the glucose content is below the preferred maximum hereinafter described, are first converted into aqueous solutions having a glucose content below such preferred maximum. The preferred maximum glucose content is a quantity of glucose which when fermented will not yield more than approximately 6% alcohol, by weight, based on the total weight of the composition. Satisfactory results are obtained by assuming that the glucose will yield approximately 45% of its weight of alcohol and ignoring the small amount of glucose which is not fermented. For example, if the sucrose solution contains 13% glucose based on the total weight of the solution, this should yield 45% of 13%, or 5.85% alcohol, which is below the preferred maximum. It has been found that in the case of a relatively impure grade of refinery molasses, for example, dilution to a Brix of 45° reduces the glucose content to about 13%, or within the preferred range.

Usually such impure sucrose compositions do not contain sufficient water to give the desired specific gravity and glucose content. Accordingly, they are diluted with an aqueous medium such as water. The water added may be relatively pure water or water containing materials of the same general nature as those present, particularly water derived from other points in the system or from general refinery operations, such as, for example, the sweet water from washing the various precipitates separated in any one or more of the filtration steps which are hereinafter more fully described. On the other hand excessive dilution is undesirable and in the infrequent instances where the sucrose composition to be treated is excessively dilute, it may be concentrated, as for example, by heating or boiling to evaporate a portion of the water present, or may be employed as a diluent for other sucrose compositions.

The purpose in controlling the glucose content is to avoid having the alcohol formed slow down or stop the final fermentation before it has proceeded to the desired extent. So long as the percentage of alcohol in the solution is not greater than about 6% the rate of fermentation is not materially affected by the quantity of alcohol present. Where the alcohol concentration rises above this percentage, however, the fermentation tends to be slowed down by the presence of the alcohol, and in particular, the alcohol tends to kill the yeast and stop it from budding. Thus, by keeping the glucose content sufficiently low so as to produce not more than about 6% alcohol, the fermentation proceeds to the desired extent before the alcohol formed materially affects its rate, whereas with higher glucose concentrations, the rate of fermentation will be affected adversely before the same proportion of glucose is fermented. It will be apparent, of course, that the glucose content can be as low as desired, provided the solution is not excessively dilute with respect to sucrose, since the less glucose present, the better, because the purpose of the process is to eliminate glucose, among other things.

While keeping the glucose content within the preferred range the specific gravity is adjusted in some cases for the purpose of promoting the fermentation of glucose without material fermentation of sucrose, and in others to avoid producing excessively dilute sucrose solutions, to avoid handling excessive quantities of material resulting from too low a specific gravity and to avoid handling too thick or viscous mixtures where the gravity is too high, so that among other things, the mixtures do not heat readily. To this end it is preferable to keep the Brix of the solutions in the neighborhood of 45° or somewhat higher where this is consistent with a glucose content below the preferred maximum.

Although it is generally necessary to add water or an aqueous diluent, in accordance with the preferred procedure, its addition is not absolutely necessary. Thus, some sucrose solutions already have a satisfactory specific gravity and glucose content and others of satisfactory gravity and glucose content may be prepared by blending different sucrose solutions of the same or different types. Furthermore, even where the gravity and glucose content do not correspond with the preferred values, the addition of water or an aqueous medium, as such, may be omitted in certain circumstances, as for example, where the alkaline reagent is added to the sucrose solution in very dilute form so that the water added with the alkaline material brings the water content of the mixture up to the minimum required for maximum extraction of the sweetening ingredients.

Where the addition of an aqueous medium or the concentration of the sucrose solution is desirable, for the purpose of giving a composition having a gravity which lends itself to easy handling during the precipitation of impurities, it is apparent, of course, that such dilution or concentration should take place prior to or at the start of the treatment with the alkaline and acid materials. On the other hand where the gravity is satisfactory from the standpoint of handling during the precipitation of impurities, but the glucose content is too high, for example, it is within the scope of the invention to dilute the composition, for the purpose of reducing the glucose content, at any time prior to the fermentation step. Where the dilution takes place just prior to the fermentation step, however, care is preferably exercised to see that any water or other aqueous medium added is sterile in order to avoid introducing wild yeast strains, since the sucrose solution which has been subjected to the treatment for the precipitation of impurities is sterilized by such treatment and, in fact, this is one of the advantages of the procedure described herein.

In the light of the foregoing, it has been found preferable, in general, to dilute the sucrose composition at the start of the treatment to the point where it contains less than about 13% glucose, ignoring any diluents which may be added thereafter, unless the dilution taking place during defecation is considerably greater than in the preferred procedure described above. This procedure avoids any complicated estimations of the effect of the diluents and at most will result in a glucose content which is still within the preferred range but is further below the maximum than it was when first diluted. This procedure also insures the production of a sterile sucrose and glucose solution ready for fermentation and similarly, insures that the glucose content of this solution will be within the preferred range.

When certain impure sucrose solutions such as cane molasses, particularly the poorer grades of cane molasses, are diluted to the preferred specific gravity, a substantial quantity of solid material settles or precipitates out, particularly when the diluted mixture is allowed to stand for a substantial period of time, for example, overnight. This precipitate or these settlings may amount to as much as 8 to 10%, or more, by volume of the diluted sucrose solution.

If desired, the clear liquid above this precipitate may be decanted off before proceeding with the addition of alkaline material, as described hereinafter, or the precipitate may be separated by filtration and washed, if desired. In order to avoid the loss resulting from separation by decantation or the extra filtration step which is difficult, the entire mixture including the precipitate, without either decantation or filtration, may be carried to the next step which is the addition of alkaline material. The precipitate will then be separated along with the other impurities precipitated by the alkaline and acid materials to be added.

Proceeding with the description of the preferred procedure, the impure sucrose solution, preferably with its gravity and glucose content adjusted as above described, if necessary, is next treated with a divalent alkaline material. If a test has not already been made to determine the maximum pH to which to increase the sucrose solution with alkaline material, it is made at this point, in the manner described in detail above, along with a determination of the pH to which the sucrose solution is thereafter reduced with an acidic material, preferably noting also the quantities of the acid and alkaline reagents required to bring about the appropriate adjustments of pH.

A suitable alkaline reagent is added to the sucrose solution to raise the pH of the sucrose solution to approximately the maximum determined by test, as described, the sucrose solution being maintained below about 54° C., during this addition.

Suitable alkaline materials with which to increase the pH are alkaline defecating agents, that is, alkaline materials which are eliminated from the mixture at a later stage of the process and which are also capable of precipitating undesired impurities. Divalent alkaline materials, and particularly the alkaline earth metal oxides and hydroxides, such as the oxides and hydroxides of barium, calcium, strontium and magnesium have been found to possess the desired properties. The preferred divalent alkaline material is lime, more particularly hydrated lime having a purity of 90% or better and preferably a purity as high as 98% and which has a relatively low magnesium content (1½% or less), but other divalent alkaline materials, both organic and inorganic may be used. Preferably, also the divalent alkaline material should be finely ground in order to give more rapid distribution and reaction.

The alkaline reagent used is preferably a dilute aqueous solution or suspension of the alkaline material. The addition of the alkaline material in the form of a dilute aqueous solution or suspension, particularly when accompanied by agitation of the mixture during and after the addition of the alkaline reagent in accordance with the preferred procedure, aids in producing a homogeneous mixture and in avoiding local high concentrations of the alkaline material which are not desirable.

Following the addition of the alkaline reagent to the sucrose solution in sufficient quantity to increase the pH of the sucrose solution to the predetermined maximum, the agitation is preferably continued until the resulting reaction is completed. The time required for the completion of the reaction varies somewhat as indicated above in describing the test, and it is preferable to allow from 10 to 20 minutes or such other period as the test may indicate to be necessary for the reaction to take place in order to be sure that it has proceeded to completion.

After the completion of the reaction with the alkaline reagent the sucrose solution still maintained at a temperature below about 54° C., is preferably acidified promptly with a suitable acid in a quantity sufficient to reduce the pH to the pH determined by test, as described above, to be the pH beyond which further additions of acid do not produce any additional precipitate. The prompt addition of acid following the completion of the reaction at the maximum pH is preferred since it aids in avoiding a permanent or difficulty removable color in the filtrate, but it is important to allow sufficient time after the maximum pH is reached to insure that the reaction at this pH is complete before adding this acid. The acid reagent used is preferably a dilute aqueous solution of the acid and it is also preferable to agitate the mixture during and after the addition of the acid reagent. Agitation following the addition of the acid reagent is particularly desirable to aid in producing a homogeneous mixture and to aid in completing the reaction of the reagents.

The preferred acid with which to reduce the pH is phosphoric acid. While phosphoric acid is preferred because it gives consistently good results in eliminating impurities, forms granular, easily filterable and washable precipitates, aids in eliminating color, and does not give undesirable properties to the sucrose solutions, such as bad taste, other acids may be used for part or all of the acidification, but are not preferred because of their inferiority in one respect or another to phosphoric acid. Suitable acidic materials to use are acid defecating agents, that is any acid or combination of acids may be used which when added in sufficient quantity under the pH conditions specified will form insoluble compounds with the alkaline material used and with the impurities to be precipitated. Acids such as citric and sulphuric have been used where lime was the alkaline reagent, but neither of these gives as consistently good results as phosphoric acid.

Carbon dioxide or its corresponding acid carbonic acid, is also capable of eliminating both the impurities and the alkaline material, but after the pH has decreased to 9.2 this acid dissolves lime to form bicarbonates. The bicarbonates may be eliminated, however, with the aid of compounds such as sodium carbonate or sodium aluminate, for example, by adding a small amount of such compounds to the liquid filtrate and heating, preferably above 95° C.

Concentrations of the dilute solutions or suspensions of lime and phosphoric acid are preferably of the order of 10 to 20% by weight. Lime or phosphoric acid solutions or suspensions having lower or somewhat higher concentrations may be used if desired. With solutions or suspensions of higher concentrations, it is preferable to exercise care during the addition to avoid local high concentrations of the reagent. The use of lower concentrations of the order of 6% or considerably less, involves the handling of larger quantities of reagent, but it is advantageous in promoting better distribution of the reagent or where a part of the water is to be supplied by the reagent solution.

Although the concentrations of the alkaline and acid reagents have been discussed together with particular reference to lime and phosphoric acid, it will be understood that in the treatment of any given batch of sucrose containing material, it is by no means essential that the lime and phosphoric acid reagents be of the same or even approximately the same strength. Furthermore, the above discussion of concentration, which particularly refers to lime and phosphoric acid, is intended to be representative with respect to other alkaline and acidic materials. Appropriate concentrations of other alkaline and other acidic materials will be readily apparent to those skilled in the art or can be readily determined by a simple test.

After the pH has been adjusted to the predetermined point by the addition of the acid reagent, sufficient time for reaction is preferably allowed and the mixture which has preferably been maintained below 54° C. up to this point is then preferably heated to a temperature between about 54° C., and the boiling point of the mixture to complete the reaction and bring about the precipitation of the maximum quantity of impurities in the form of a granular and usually applesauce-like precipitate.

The mixture is now ready to be filtered and, as described above, this filtration may be accomplished in any of a wide variety of filtering devices, such as a filter press, a centrifuge, an Oliver type vacuum filter, either straight or precoated with a filter aid, or plain equipment. It has been found that particularly good results are obtained with the Oliver filter, used either as a straight vacuum filter or preferably with a precoat of a filter aid. Preferably, where the precoat filter is not used, the resulting filtrate is run over a bag filter to take out any minor particles which may be carried through, due to leaky filtering mediums.

If desired, a quantity of a filter aid may be added to the foregoing mixture prior to filtration in order to improve its filtering character. Suitable filter aids include calcium carbonate, diatomaceous earth and bagasselio. Due to the fact that the present process yields a granular, easily filterable and washable precipitate, the addition of such filter aids is generally unnecessary and for some purposes, at least, is usually undesirable. Certain of the filter aids, for example, materially detract from the value of the separated solids when present therein.

The solid material separated by the above filtration is preferably washed to remove any small amount of sugar containing liquid remaining therein. For this purpose ordinary water may be used, but preferably the pH of the water is adjusted to approximately the pH of the filtrate in order to avoid redissolving any precipitated impurities. For example, where the filtrate is acid, as will ordinarily be the case, a suitable quantity of phosphoric or other acid, preferably the same acid previously used, is added to the wash water to give it the same pH as that of the filtrate. The wash water is preferably heated and the washing is preferably continued until the precipitate contains less than about 1% sugars, by weight. The wash water is also preferably passed through the bag filter, if one is used, in order to wash out any of the filtrate which may remain in this filter.

The wash water or sweet water from washing the separated solids, as described, may either be added to the main body of the filtrate or may be returned into the system for use as a diluent. This is part of the wash water or sweet water referred to above as being suitable for use to supply additional water to the original sucrose composition in order to give it the preferred specific gravity, and/or glucose content. This sweet water may also be used instead of ordinary water as the diluent in making up the acid or alkaline reagent solutions or suspensions. It should be borne in mind, however, that this sweet water itself will contain some glucose so that it may be necessary to make an allowance for the glucose content of the wash water where it is added to adjust the glucose content. Also, where the wash water is acidified to the pH of the filtrate, it may be necessary to take this factor into account in using such wash water as a diluent.

Where the filtration is conducted in accordance with the preferred procedure on an Oliver vacuum filter precoated with a filter aid, it is preferable to include the wash water or sweet water in the filtrate. The Oliver filter is set so that sufficient time is allowed to permit the completion of the filtration of the material which is picked up on the surface of the filter aid, and also to permit washing of this filtered material before the scraper knife is reached. Sprays of wash water are positioned to spray wash water onto the solids after their filtration is substantially complete, this wash water then passing into the interior of the drum along with the filtrate.

In accordance with the preferred procedure, the wash water is supplied at an elevated temperature between about 54° C., and the boiling point and with a pH approximately the same as that of the filtrate. Preferably this wash water will have substantially the same temperature when it strikes the solids on the surface of the drum as the mixture undergoing filtration has. It has been found, in general, that about 5%, by volume, of wash water, based on the volume of the filtrate, is entirely adequate to reduce the sugar content of the filtered solids to about 1% or less.

It is preferable that the sucrose solution during fermentation have a substantially neutral pH. Accordingly before subjecting the clear filtrate obtained by the preferred procedure, as described above, to the fermentation treatment, it is preferable to adjust this pH, if necessary, in order that it may be approximately and preferably substantially neutral. Usually, as already indicated, this clear filtrate will have a definitely acid pH, particularly where the preferred procedure is followed and the sucrose solution is a molasses, particularly a plantation molasses. In such cases the clear filtrate is neutralized by adding an alkaline material, preferably a divalent alkaline material, as described above, and preferably the same alkaline material previously used. The neutralized filtrate, which may or may not also contain the wash water, is then heated to a temperature between about 54° C. and the boiling point of the mixture to complete the reaction and formation of any precipitate which results, and is refiltered in any of the ways described above, if necessary. The separated solids resulting from this filtration are washed as described above with respect to the solids from the preceding filtration step. However, since this filtrate is substantially neutral, it is not necessary to adjust the pH of the water, although it is preferable that it be hot water. The neutralization of the filtrate obtained by filtering out the main body of solids formed by adding the acid and alkaline reagents is particularly preferred where this filtrate has a pH below about 6.3 or above about 8 not only where fermentation is to follow but also where it is intended to be used for other purposes.

Although the foregoing procedure is preferred, according to an alternative procedure the precipitate formed by adding acid and alkaline reagents in accordance with the results of the foregoing test and heating is not separated immediately if the pH is not in the vicinity of neutrality. Instead if the pH is distinctly acid, for example, more of the alkaline reagent is added to bring the pH of the unfiltered mixture up to approximately neutrality and after heating again the first precipitate and any precipitate formed as the result of such neutralization are separated in a single filtration. Two filtrations as first decribed are preferred, however, since neutralization prior to separation of the first precipitate by filtration may cause a portion of the impurities to redissolve. It will be apparent, of course, that where the pH of the solution at the time of filtration or of the filtrate obtained thereafter is distinctly alkaline, more of the acid reagent should be added before or after filtration, filtering again if necessary in order to yield a final filtrate having approximately a neutral pH. The substantially neutral filtrates hereinbefore described are substantially sterile.

Although it is generally unnecessary and undesirable the purity of this filtrate may be further increased in some cases, if desired, by treatment with ion exchange bodies. As examples of such materials, mention is made of base exchange bodies, such as zeolites, permutit and amines. With or without the treatment with base exchange bodies the substantially or approximately neutral filtrate referred to above is a relatively pure solution of glucose and sucrose and is, therefore, suitable for use as a sweetening medium without further treatment to isolate the sucrose, although where it is to be so used without separating the sucrose in crystalline form it is desirable in many cases to decolorize and/or concentrate it.

In accordance with the preferred procedure of the present invention, however, the sucrose is to be recovered in relatively pure crystalline form and accordingly the substantially neutral and substantially sterile clear filtrate is next cooled to a temperature suitable for fermentation with the particular ferment to be employed, usually about 30° C. This cooling may be accomplished in any desired manner, for example, through a heat exchanger. When cooled to the proper temperature, it is inoculated with from about 10% to about 30%, by volume, based on the volume of the clear filtrate, of a culture of a yeast, which, under the conditions of fermentation, will ferment the glucose sugars into alcohol, carbon dioxide and a small quantity of by-products without materially affecting any sucrose present. Preferably the yeast employed will be a yeast which is, in itself, selective, having substantially no effect on the sucrose, such as yeasts of the saccharomyces apiculatus group. The culture is preferably prepared by inoculating a suitable nutrient solution with the yeast to be employed and allowing the culture to develop. The culture is preferably added when it is very active. The preferred amounts of yeast culture to be added as set forth above are based on the use of such a very active yeast culture. Less than about 10% and more than about 30%, by volume, of yeast culture may be used, however, if desired. Amounts of yeast culture less than 10%, by volume, are not preferred because the result of using such small amounts is to increase the fermentation time unnecessarily. On the other hand, amounts of yeast culture greater than 30% are not preferred because the cost of using such large amounts of yeast is out of proportion to the saving in fermentation time. Such larger amounts may be used, however, and when used have the two advantages of reducing fermentation time and reducing the chances of contamination of the pure yeast culture.

During fermentation the mass is preferably gently agitated and this agitation is preferably accomplished by aeration, so that the mixture is subjected simultaneously to agitation and aeration. If the substantially or approximately neutral filtrate to be fermented has a glucose content which is so high that it will produce more than about 6% alcohol, it is preferably diluted prior to fermentation sufficiently to reduce the glucose content to about 13% or less as pointed out above.

Excessive dilution has the disadvantage that it necessitates eliminating larger quantities of water, thereafter in the crystallization of the sucrose and gives a more dilute alcohol on distillation. By way of illustration it may be mentioned that a glucose content of about 10 to 11% producing about 5% alcohol gives very satisfactory results.

Selective fermentation of sucrose solutions containing glucose for the purpose of eliminating the glucose without materially affecting the sucrose is well known in the art, however, and it is to be understood that, although the preferred fermentation procedure is described in detail above, any desired fermentation procedure may be used within the scope of the present invention in order to convert the glucose into alcohol and eliminate it without materially affecting the sucrose. Thus the fermentation may be conducted at any desired temperature or with any desired type of yeast.

It is generally impracticable to continue the fermentation long enough to ferment all of the glucose present. For this reason, the fermentation is usually continued only so long as it proceeds at a reasonable rate, that is, until all of the glucose has fermented which will ferment in a reasonable time. For a glucose concentration within a given range in solutions which have approximately the same composition and with a standard yeast culture, the period during which fermentation proceeds at a reasonable rate is relatively uniform. Accordingly when this time has been determined the usual procedure is simply to continue the fermentation for such established time. The period is generally several days, for example, about three days where the preferred procedure is employed. The fermentation may be carried out to any desired extent, however, within the scope of this invention.

When fermentation has proceeded to the desired extent or for the period of time allowed therefor, the yeast is preferably separated by filtration. Any desired filtering means may be used, for example, a centrifugal separator or an ordinary filter press. As pointed out above, this filtration step is desirable not only because the yeast is valuable enough to make its recovery attractive, particularly, if it is one of the selective types, but also because the yeast culture assimilates a small amount of objectionable ash forming materials when they are present and carries them out of the solution when separated by filtration, permitting a higher ultimate yield of sucrose, in crystallization.

The yeast free filtrate is now preferably directed to suitable means for recovering or separating the alcohol therefrom. A very satisfactory method of accomplishing this separation is to distill off the alcohol, which may be recovered and with or without further treatment, for example, such as redistillation to eliminate water, may be disposed of for any of a variety of purposes. Substantially complete recovery of alcohol from the sucrose solution is obtained in any ordinary distilling equipment. The sucrose solution now freed of the alcohol is ready to be subjected to the usual process for crystallizing sucrose from its solutions. Thus where the alcohol has been separated by distillation, the slops from the still which are the purified sucrose solution, are removed from the still and directed to suitable means for crystallizing out the sucrose, as, for example, to a sugar house in the refinery in which the crystalline sucrose is obtained by conventional processing.

Starting with the refinery cane molasses and treating according to the preferred process described above, results in the production of a sucrose solution from which approximately 50% of the sucrose therein may be reclaimed by a single boiling. The final molasses from this strike or crystallization may be reboiled or if the ash content is too high for a reboiling, may be treated through any standard saccharating process, such as the Barium or Steffens process process of lime saccharation, to recover still further quantities of sucrose or may be treated again, as described above, to eliminate impurities either with or without mixing with some other impure sucrose solution, such as the refinery cane molasses. The sucrose solution from which the alcohol has been separated is also suitable for use as such, where a sirup product is desired, and in this event it becomes unnecessary to subject the solution to the crystallization procedure.

The solid material filtered out in the above described process, particularly the granular precipitate, is valuable and can be dried and used for various purposes, preferably after washing, as described above. For example, this material is suitable for use as a fertilizer.

It is, of course, preferable to add to any impure sucrose solution just the quantities of reagents required to give the optimum pH's, predetermined by test, as described above. The invention is not, however, intended to be limited strictly to the use of the optimum conditions. Moderate variations from the optimum points do not greatly affect the results and such moderate variations are, therefore, within the scope of the invention.

To further facilitate understanding of the improved method of recovering crystalline sucrose from impure sucrose solutions which is disclosed herein, the following detailed example is given. This example is, however, merely illustrative and is not intended to be construed as limiting the scope of the invention.

*Example*

Twenty parts of low grade plantation molasses of about 75° Brix, containing 30.4% sucrose, 17.6% glucose, and 26.9% other impurities are charged into a tank provided with an agitator and with means for heating the tank. Water is then added in sufficient quantity to dilute the molasses to 45° Brix. The molasses after dilution contains 18.3% sucrose, 10.6% glucose, and 16.2% other impurities. It will be seen that this glucose content is below the preferred maximum of about 13% and that the sucrose purity is 40.6%.

A 10° Brix aqueous solution or suspension of lime is then added to the diluted molasses in the tank. The addition of the lime reagent is accompanied by agitation and continued until the pH of the mixture has increased to pH 11.2, indicated by previous test, as described above, to be the proper pH above 10 to which to increase the pH of the mixture with lime. Agitation is continued thereafter until the lime is thoroughly distributed and the resulting reaction completed. About 15 minutes is allowed for this purpose, after the lime has all been added.

When the reaction resulting upon the addition and thorough distribution of the lime is complete, the pH of the mixture is then reduced to pH 5.3 (the pH predetermined as described above) by adding phosphoric acid in the form of a 10° Brix aqueous solution, the mixture being agitated during the addition of the acid to insure its thorough distribution. Following the addition of water as described above, that is, from the start of the addition of the lime until the addition of the acid is completed, care is taken to see that the temperature of the mixture is at all times maintained below about 54° C. When the addition and thorough distribution of the acid is completed, however, the entire mass is then heated to 75° C. to complete the reaction.

A granular precipitate results and the solids are then readily separated by running the mass over an Oliver type precoated filter to yield a clear filtrate. The separated solids are washed with water which has been acidified to pH 5.3 with phosphoric acid and heated to a temperature of about 65° C. The washing is continued until the solids contain less than about 1% sugars and these washings are added to the clear filtrate. The washed solids are removed and dried for disposition as fertilizer or for other purposes.

The clear filtrate and washings from the Oliver filter are passed into a tank provided with an agitator and means for heating the tank. The aforementioned 10° Brix aqueous solution or suspension of lime is then added to the tank in sufficient quantity to neutralize the filtrate and washings, that is, to bring the pH of the mixture to about 7. The neutralized mixture in the tank is thoroughly agitated to bring about uniform distribution of the lime and heated to its boiling point (a temperature between about 75° C. and the boiling point is usually sufficient) to complete the neutralization reaction. The precipitate resulting from this neutralization reaction is then separated on an Oliver type precoated vacuum filter. As before, this precipitate is washed with water until the solids contain less than about 1% sugars and the washings are added to the clear filtrate. Since this last filtration takes place at about pH 7, it is unnecessary to adjust the pH of the wash water, but this wash water is supplied at a temperature of about 80° C. The solids separated in this filtration are also recovered and dried.

The clear liquid including filtrate and washings from the last filtration step, is found on analysis to have a sucrose purity of 45.1%. It is, also, sufficiently sterile so that it can be given the fermentation treatment immediately without further processing. To this end it is first cooled to about 30° C. by passing it through a heat exchanger and is then placed in a fermentation tank provided with means for agitating the liquid therein by aeration. Mechanical agitation also gives good results.

A culture of *Torulopsis monosa*, a selective yeast adapted to ferment the glucose or reducing sugars without materially affecting the sucrose, is prepared by inoculating a sterilized 25° Brix molasses solution with the above named yeast and allowing the culture to grow at about 30° C. in a sealed container until it is very active. This requires about two to three days. The culture so prepared is then added to the tank in the amount of about 20%, by volume, based on the volume of the clear filtrate and washings, and another portion of this culture is retained for use as described below. Air is then directed into the liquid in the tank to both aerate and agitate the mixture in order to promote the action of the yeast.

Three days are allowed to permit the fermentation to proceed to the desired extent as described above and the fermented mixture is then passed through a centrifugal separator to recover the yeast. The yeast free liquor is directed to an ordinary still and the alcohol formed during the fermentation is distilled off.

The portion of the very active culture retained, as described above, is used to inoculate another sterilized 25° Brix molasses solution, the culture being added in the amount of about 10%, by volume, based on the volume of the sterilized 25° Brix molasses solution. After about 24 hours the culture in this last named molasses solution is active enough to pitch into the main fermentation. Subsequent cultures are prepared in the same way since this provides a means for obtaining yeast to inoculate the main batch in 24 hours instead of two to three days as is required where the culture has not been brought to high activity just prior to inoculation, by growing it in a nutrient solution at 30° C.

Excellent results have also been obtained by employing the selective yeast *Candida monosa* in place of *Torulopsis monosa* as described in this example. *Candida monosa* is also adapted to ferment the glucose as reducing sugars without materially affecting the sucrose.

The relatively pure sucrose solution remaining in the still after the separation of the alcocol is sent to a refinery sugar house for the crystallization of a strike of sugar. Approximately 50% of the sucrose present is reclaimed in a single boiling. The final molasses from this strike is treated by the Steffens process of lime saccharation to recover still further quantities of sucrose.

A sample of the purified sucrose solution remaining in the still after the separation of the alcohol by distillation as described above, is found on analysis to have a Brix of 27°, and to contain about 17.9% sucrose, 1.2% glucose, 7.9% other impurities. After separation of the alcohol, there are 32.3 parts by weight, of purified sucrose solution and from the foregoing analysis it can be calculated that it contains about 5.78 parts, by weight, of sucrose or about 95% of the sucrose present in the original molasses. It can also be calculated that this solution has a sucrose purity of 66.2%.

It will be understood that throughout this specification and the claims appended hereto, wherever "degrees Brix" are referred to, they are intended to mean the per cent of solids, by weight, based on the total weight of the composition, whether the solids be dissolved or undissolved and in the latter case, regardless of whether or not they are suspended in the liquid present. Degrees Brix are sometimes used to indicate the per cent, by weight, of sugar in solution, but are not given that meaning in this specification and claims. "Sugars purity," as used herein is expressed in terms of the quantity of sucrose as related to the total solids materials in solution with the sucrose in a common solvent. The term "glucose" as used herein has the relatively broad meaning commonly given it in the sugar industry, and thus means "reducing sugars generally" and not merely the chemical compound bearing the same name. The term "selective fermentation" as used herein means any fermentation of a mixture including both sucrose and glucose in which the glucose is fermented without materially affecting the sucrose, whether this be accomplished by the use of selective yeasts or by other means, as for example, by controlling conditions of fermentation such as the concentration of ingredients in the sucrose solution.

Many of the advantages of this invention have been brought out in the foregoing description. The process disclosed herein provides, for the first time, a practical and economical method of recovering in useful form the sucrose content of impure sucrose solutions including even those containing substantial quantities of glucose and other impurities down through the lowest grades of plantation cane molasses. The explosive and fire hazard in handling large quantities of alcohol as in prior processes is eliminated and better recovery of alcohol is obtained at less expense. Also the impurities are precipitated in a maximum amount in a form in which they are very readily separated by any desired filtering means and which permits the separated precipitate to be very easily washed or sweetened off as contrasted with the difficultly filterable compositions obtained in prior processes. This process also compares very favorably with prior processes in the ease with which it is carried out, in cost, in extent of impurity elimination and in percentage recovery of sucrose. Another advantage is that the filtrate after initial separation of impurities or after initial separation of impurities followed by further treatment such as neutralization is not only useful as a sweetening medium but also has a sterility which is particularly desirable in compositions to be given a selective fermentation treatment. Many other advantages of the invention will appeal to those skilled in the art.

It is apparent that many widely different embodiments of this invention may be made without departing from the spirit and scope thereof and, therefore, it is not intended to be limited except as indicated in the appended claims.

We claim:

1. In the process of purifying impure sucrose compositions comprising glucose and other impurities, the steps which comprise adding to an aqueous solution comprising the impure sucrose composition a divalent alkaline defecating agent in an amount sufficient to increase the pH of the sucrose solution to substantially the pH above 10 at which a break occurs and which results in the formation subsequently of a granular, readily filterable and washable precipitate, then when the reaction at this pH is complete adding an acid defecating agent in an amount sufficient to reduce the pH of the sucrose solution to a pH between about pH 9.2 and the minimum pH of the natural juices of any plant producing sucrose and glucose in combination and at which pH the aforementioned granular, readily filterable and washable precipitate is obtained, then separating the precipitate so formed to leave a clear liquid, said composition being maintained at a temperature below about 54° C., at least during the time when it has a pH above about 9.2.

2. In the process of purifying impure sucrose compositions comprising glucose and other impurities, the steps which comprise adding to an aqueous solution comprising the impure sucrose composition a divalent alkaline defecating agent in an amount sufficient to increase the pH of the sucrose solution to substantially the pH above 10 at which a break occurs and which results in the formation subsequently of a granular, readily filterable and washable precipitate, then when the reaction at this pH is complete adding an acid defecating agent in an amount sufficient to reduce the pH of the sucrose solution to a pH between about pH 9.2 and the minimum pH of the natural juices of any plant producing sucrose and glucose in combination and at which pH the aforementioned granular, readily filterable and washable precipitate is obtained, then separating the precipitate so formed to leave a clear liquid, said composition being maintained at a temperature below about 54° C., at least during the time when it has a pH above about 9.2, and being thereafter heated to a temperature between about 54° C. and the boiling point of the mixture prior to said separation to complete the formation of the granular, readily filterable and washable precipitate.

3. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination, and at which pH the aforementioned granular, readily filterable and washable precipitate is obtained, then separating the precipitate so formed to leave a clear liquid, said composition being maintained at a temperature below about 54° C. at least during the time when it has a pH above about 9.2.

4. In the process of purifying impure sucrose compositions comprising glucose and other impurities, the steps which comprise adding to an aqueous solution comprising the impure sucrose composition a divalent alkaline defecating agent in an amount sufficient to increase the pH of the sucrose solution to substantially the pH above 10 at which a break occurs and which results in the formation subsequently of a granular, readily filterable and washable precipitate, then when the reaction at this pH is complete adding an acid defecating agent in an amount sufficient to reduce the pH of the sucrose solution to a pH between about pH 9.2 and the minimum pH of the natural juices of any plant producing sucrose and glucose in combination below which pH further additions of said acidic material do not produce any additional precipitate, then separating the precipitate so formed to leave a clear liquid, said composition being maintained at a temperature below about 54° C., at least during the time when it has a pH above 9.2.

5. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination below which pH further additions of said phosphoric acid do not produce any additional precipitate, then separating the precipitate so formed to leave a clear liquid, said composition being maintained at a temperature below about 54° C., at least during the time when it has a pH above about 9.2.

6. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination below which pH further additions of said phosphoric acid do not produce any additional precipitate, maintaining said composition at a temperature below about 54° C., at least during the time when it has a pH above about 9.2, then, after the addition of said phosphoric acid, heating the composition to a temperature between about 54° C. and the boiling point of the mixture to complete the formation of the precipitate, separating the precipitate so formed to leave a clear liquid, neutralizing the clear liquid, heating the neutralized liquid to a temperature between about 54° C. and the boiling point of the neutralized liquid and separating any precipitate so formed.

7. In the process of purifying impure sucrose compositions comprising glucose and other impurities, the steps which comprise adding to an aqueous solution comprising the impure sucrose composition a divalent alkaline defecating agent in an amount sufficient to increase the pH of the sucrose solution to substantially the pH above 10 at which a break occurs and which results in the formation subsequently of a granular, readily filterable and washable precipitate, then when the reaction at this pH is complete adding an acid defecating agent in an amount sufficient to reduce the pH of the sucrose solution to a pH between about pH 9.2 and the minimum pH of the natural juices of any plant producing sucrose and glucose in combination and at which pH the aforementioned granular, readily filterable and washable precipitate is obtained, then separating the precipitate so formed to leave a clear liquid, and subjecting the clear liquid to selective fermentation at fermentation temperature to eliminate the glucose without materially affecting the sucrose, said composition being maintained at a temperature below about 54° C., at least during the time when it has a pH above about 9.2.

8. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination, and at which pH the aforementioned granular, readily filterable and washable precipitate is obtained, then separating the precipitate so formed to leave a clear liquid, and subjecting the clear liquid to selective fermentation at fermentation temperature to eliminate the glucose without materially affecting the sucrose, said composition being maintained at a temperature below about 54° C., at least during the time when it has a pH above about 9.2.

9. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination below which pH further additions of said phosphoric acid do not produce any additional precipitate, maintaining said composition at a temperature below about 54° C., at least during the time when it has a pH above about 9.2, then, after the addition of said phosphoric acid, heating the composition to a temperature between about 54° C. and the boiling point of the mixture to complete the formation of the precipitate, separating the precipitate so formed to leave a clear liquid, neutralizing the clear liquid, heating the neutralized liquid to a temperature between about 54° C. and the boiling point of the neutralized liquid, separating any precipitate so formed, and then subjecting the neutralized liquid to selective fermentation at fermentation temperature to eliminate the glucose without materially affecting the sucrose.

10. In the process of purifying cane molasses, the steps which comprise adding a divalent alkaline defecating agent to the cane molasses in an amount sufficient to increase the pH of the molasses to substantially the pH above 10 at which a break occurs and which results in the formation subsequently of a granular, readily filterable and washable precipitate, then when the reaction at this pH is complete, adding an acid defecating agent in an amount sufficient to reduce the pH of the molasses to a pH between about pH 9.2 and the minimum pH of the natural juices of any plant producing sucrose and glucose in combination and at which pH the aforementioned granular, readily filterable and washable precipitate is obtained, then separating the precipitate so formed to leave a clear liquid, said composition being maintained at a temperature below about 54° C., at least during the time when it has a pH above about 9.2.

11. In the process of purifying cane molasses, the steps which comprise adding lime to the cane molasses in an amount sufficient to increase the pH of the molasses to substantially the pH above 10 at which a break occurs and which results in the formation subsequently of a granular, readily filterable and washable precipitate, then when the reaction at this pH is complete adding phosphoric acid in an amount sufficient to reduce the pH of the molasses to a pH between about pH 9.2 and the minimum pH of the natural juices of any plant producing sucrose and glucose in combination, and at which pH the aforementioned granular, readily filterable and washable precipitate is obtained, then separating the precipitate so formed to leave a clear liquid, and subjecting the clear liquid to selective fermentation at fermentation temperature to eliminate the glucose without materially affecting the sucrose, said composition being maintained at a temperature below about 54° C., at least during the time when it has a pH above about 9.2.

12. In the process of purifying impure sucrose compositions comprising glucose and other impurities, the steps which comprise adding to an aqueous solution comprising the impure sucrose composition a divalent alkaline defecating agent in an amount sufficient to increase the pH of the sucrose solution to substantially the pH above 10 at which a break occurs and which results in the formation subsequently of a granular, readily filterable and washable precipitate, then when the reaction at this pH is complete adding an acid defecating agent in an amount sufficient to reduce the pH of the sucrose solution to a pH between about pH 9.2 and the minimum pH of the natural juices of any plant producing sucrose and glucose in combination and at which pH the aforementioned granular, readily filterable and washable precipitate is obtained, then separating the precipitate so formed to leave a clear liquid, and subjecting the clear liquid to selective fermentation at fermentation temperature to eliminate the glucose without materially affecting the sucrose, said composition being maintained at a temperature below about 54° C., at least during the time when it has a pH above about 9.2, and said fermentation being carried out with a selective yeast.

13. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination, and at which pH the aforementioned granular, readily filterable and washable precipitate is obtained, then separating the precipitate so formed to leave a clear liquid, and subjecting the clear liquid to selective fermentation at fermentation temperature to eliminate the glucose without materially affecting the sucrose, said composition being maintained at a temperature below about 54° C., at least during the time when it has a pH above about 9.2, and said fermentation being carried out with a selective yeast.

14. In the process of purifying impure sucrose compositions comprising glucose and other impurities, the steps which comprise adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination below which pH further additions of said phosphoric acid do not produce any additional precipitate, maintaining said composition at a temperature below about 54° C., at least during the time when it has a pH above about 9.2, then, after the addition of said phosphoric acid, heating the composition to a temperature between about 54° C. and the boiling point of the mixture to complete the formation of the precipitate, separating the precipitate so formed to leave a clear liquid, neutralizing the clear liquid, heating the neutralized liquid to a temperature between about 54° C. and the boiling point of the neutralized liquid, separating any precipitate so formed, and then subjecting the neutralized liquid to selective fermentation at fermentation temperature to eliminate the glucose without materially affecting the sucrose, said fermentation being carried out with a selective yeast.

15. The process of recovering sucrose in crystalline form from impure sucrose compositions comprising glucose and other impurities, which comprises adding lime to an aqueous solution comprising the impure sucrose composition, said lime being added in an amount sufficient to increase the pH of the sucrose solution to substantially the pH above 10 at which a break occurs and which results in the formation subsequently of a granular, readily filterable and washable precipitate, then when the reaction at this pH is complete adding phosphoric acid in an amount sufficient to reduce the pH of the sucrose solution to a pH between about pH 9.2 and the minimum pH of the natural juices of any plant producing sucrose and glucose in combination below which pH further additions of said phosphoric acid do not produce any additional precipitate, maintaining said composition at a temperature below about 54° C., at least during the time when it has a pH above about 9.2, then after the addition of said phosphoric acid, heating the composition to a temperature between about 54° C. and the boiling point of the mixture to complete the formation of the precipitate, separating the precipitate so formed to leave a clear liquid, neutralizing the clear liquid, heating the neutralized liquid to a temperature between about 54° C. and the boiling point of the neutralized liquid, separating any precipitate so formed, and then subjecting the neutralized liquid to selective fermentation at fermentation temperature to ferment the glucose without materially affecting the sucrose, separating the yeast and the alcohol formed by the fermentation to leave a relatively pure sucrose solution and crystallizing a strike of sucrose from such relatively pure sucrose solution, said fermentation being carried out with a selective yeast.

ARVID M. ERICKSON.
JOHN D. RYAN.

REFERENCES CITED

The following references are of record in the file of this patent:

UNITED STATES PATENTS

| Number | Name | Date |
|---|---|---|
| 2,018,869 | Olivarius | Oct. 29, 1935 |
| 2,268,902 | Ryan | Jan. 6, 1942 |
| 1,401,433 | Olivarius | Dec. 27, 1921 |
| 2,184,570 | Teatini | Dec. 26, 1939 |
| 2,071,776 | Teatini | Feb. 23, 1937 |
| 1,988,923 | Teatini | Jan. 22, 1935 |
| 1,755,165 | Bull | Apr. 22, 1930 |
| 1,876,491 | Foster | Sept. 6, 1932 |
| 2,059,971 | Scott | Nov. 3, 1936 |
| 2,067,362 | Von Steitz | Jan. 12, 1937 |
| 2,164,186 | Brown | June 27, 1939 |
| 1,047,082 | Kolarik | Dec. 10, 1912 |
| 1,052,113 | Wiese | Feb. 4, 1913 |
| 1,097,724 | Matthews | May 26, 1914 |
| 1,678,571 | Meyer | July 24, 1928 |

FOREIGN PATENTS

| Number | Country | Date |
|---|---|---|
| 13,353 | Australian | May 17, 1928 |